United States Patent Office 3,418,353
Patented Dec. 24, 1968

3,418,353
ALKYLPOLYSILOXANE FLUIDS
Edgar D. Brown, Jr., Schenectady, N.Y., assignor to General Electric Company, a corporation of New York
No Drawing. Filed Dec. 28, 1964, Ser. No. 421,588
10 Claims. (Cl. 260—448.2)

ABSTRACT OF THE DISCLOSURE

This invention relates to a new class of alkylpolysiloxanes of improved release and paintability comprising a polysiloxane in which each silicon atom in the chain contains at least one silicon-bonded methyl or phenyl radicals, in which the terminal silicon atom contains three silicon-bonded methyl or phenyl radicals, and in which at least 50% of the silicon atoms contain one silicon-bonded alkyl radical of at least 12 carbon atoms, with any remaining silicon atoms being substituted with a monovalent hydrocarbon radical free of aliphatic unsaturation and containing at least two carbon atoms. The novel compounds are used as mold release agents.

---

The present invention is directed to a new class of alkylpolysiloxane fluids. More particularly, the present invention is directed to a class of alkylpolysiloxanes in which a high proportion of the silicon atoms contain a silicon-bonded higher alkyl radical.

The use of organopolysiloxanes of various types as release agents for many types of molding applications has long been known in the art. For example, silicones have long been used in the molding of rubber articles, such as rubber gaskets for use in weather-proofing automobiles. Likewise, silicone materials of various types have been used as release agents for aluminum die casting. In each case, the silicone has been used because of its ability to withstand the temperatures and reactants involved in the molding cycle and its ability to provide excellent release of the molded article or cast article from the mold. While these materials, which are typified by the methyl silicone fluids and the methylphenyl silicone fluids, have met success as mold release agents, they have suffered one serious shortcoming. In any mold release application, some small amount of the mold release agent remains on the molded part. For many applications, the presence of a minor amount of the conventional silicone mold release agent on rubber parts or aluminum die cast articles present no problems. However, it is found that the conventional silicone mold release agents prevent the subsequent painting of articles with which they come into contact. This is particularly true with respect to the coating of articles with common alkyd resin paints.

While it might not be apparent that the use of a silicone mold release agent on a rubber gasket would affect the paintability of an automobile using the gasket, it must be remembered that subsequent to the molding of such gaskets, the gaskets are handled by assemblers and the silicone mold release agent is transferred by the fingers of the assemblers from the surface of the gasket to the metallic surface of the automobile. When subsequent attempts are made to paint the automobile with a conventional alkyd resin paint, it is found that the paint will not adhere to the area bearing the mold release agent. Likewise, it is often common to paint aluminum die cast articles with alkyd resin paints. When a conventional silicone mold release agent has been used, it is again found that alkyd resin paints will not adhere to the surface of the die cast article.

The present invention is based on my discovery of an organopolysiloxane composition which is particularly useful as a mold release agent for the molding of both conventional rubber articles and as an agent in the release of aluminum die cast articles. The compositions of my invention are triorganosilyl chain-stopped diorganopolysiloxanes containing an average of from about 4 to 40 diorganopolysiloxane units per molecule, with each diorganosiloxane unit containing one silicon-bonded methyl group and with at least 50% of the silicon atoms of the diorganosiloxane units containing one alkyl radical containing at least 12 carbon atoms, with any remaining valences of silicon in the diorganosiloxanes containing at least one monovalent hydrocarbon radical free of aliphatic unsaturation and containing at least two carbon atoms.

The triorganosilyl chain-stopped diorganopolysiloxane of the present invention can also be characterized as having the formula:

(1) 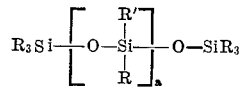

where R is a member selected from the class consisting of methyl and phenyl and R' represents a monovalent hydrocarbon radical having at least two carbon atoms and being free of aliphatic unsaturation, at least 50% of the R' radicals being alkyl radicals containing at least 12 carbon atoms, e.g., from 12 to 18 or 22 carbon atoms, and $a$ has an average value of from 4 to 40. Thus, included within the scope of Formula 1 are triorganosilyl chain-stopped diorganopolysiloxanes in which all of the R groups are the same, as well as materials in which the various silicon-bonded R groups can be different from each other. Likewise, within the scope of Formula 1 are compositions in which all of the R' groups are the same, as well as materials in which the R' group represents two or more different radicals. As is apparent from the definition of the R' group, where all of the R' groups are the same, all of the R' groups are alkyl radicals having at least 12, e.g., from 12 to 18 carbon atoms.

A particularly useful class of materials within the scope of Formula 1 are those in which two different R' groups are present in the molecule. This class of materials is represented by the formula:

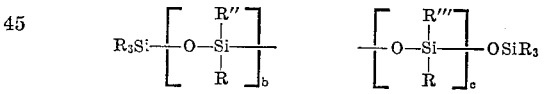

where R is as previously defined, R" is an alkyl radical containing at least 12 carbon atoms, e.g., from 12 to 16 or 22 carbon atoms, R''' is different from R" and represents a monovalent hydrocarbon radical free of aliphatic unsaturation and containing at least two carbon atoms, the sum of $b$ plus $c$ is from 4 to 40, inclusive, $c$ is equal to from 2 to 20, inclusive, and $b$ is at least equal to $c$.

From the definition of the substituents in Formula 1 and Formula 2, it is apparent that the scope of R' of Formula 1 is the same as the cumulative scope of R" and R''' of Formula 2. Illustrative of the radicals within the scope of R" are, for example, dodecyl, tetradecyl, hexadecyl, heptadecyl, octadecyl, etc. radicals. Illustrative of the radicals within the scope of R''' are, for example, alkyl radicals containing at least two carbon atoms, e.g., ethyl, propyl, butyl, octyl, decyl, etc. radicals; aryl radicals, e.g., mononuclear and binuclear aryl radicals, such as, phenyl, naphthyl, tolyl, xylyl, etc. radicals; aralkyl radicals, such as phenyl lower alkyl radicals, e.g., benzyl, phenylethyl, 2-phenylpropyl, etc., radicals; cycloalkyl radicals, e.g., cyclohexyl, cycloheptyl, etc. radicals. In the preferred embodiment of my invention, all of the radicals represented by R are methyl and where the product is a copolymer within the scope of Formula 2, it is preferred that the R''' group of Formula 2 represent a 2-phenylpropyl group.

The triorganosilyl chain-stopped diorganopolysiloxanes of the present invention vary from highly fluid materials to solid materials, depending upon their molecular weight and upon the particular organic radicals attached to silicon. As a general rule, all other things being equal, the products of the present invention will tend to be solids at higher molecular weights and liquids at lower molecular weights. Likewise, the character of the material is markedly affected by the nature of the higher alkyl group represented by R' or R''. For example, when the alkyl group represented by R'' contains 12 to 14 carbon atoms, particularly when the R groups are methyl, the materials are liquid. On the other hand, where the R groups are methyl and the R' groups are alkyl radicals containing 16 or more carbon atoms, the materials tend to be solids, regardless of the molecular weight.

The liquid versus solid nature of the product is more a characteristic of the exact nature of the R' group than on the proportion of silicon atoms containing an R' substituent which is an alkyl radical having at least 12 carbon atoms. Thus, for example, products within the scope of Formula 1 where all of the R' groups are dodecyl groups are liquid materials, and products within the scope of Formula 1 where 50% of the R' groups are dodecyl groups and 50% of the R' groups are 2-phenylpropyl radicals are also liquid materials. Likewise, materials within the scope of Formula 1 where all of the R' substituents are hexadecyl radicals are solid materials and materials within the scope of Formula 1 where 50% of the R' radicals are hexadecyl radicals and the remaining 50% of the R' radicals are ethyl radicals are also solid materials.

Where the materials within the scope of the present invention are liquid materials, they are generally clear, colorless materials. The solid materials within the scope of the present invention are generally waxy solids, which are readily soluble in hydrocarbon solvents, such as benzene, toluene and mineral spirits and the like. They are also soluble in chlorinated aliphatic hydrocarbon solvents, such as tetrachloroethylene, carbon tetrachloride and the like.

The compositions within the scope of the present invention are prepared by a relatively simple technique from organopolysiloxanes containing silicon-bonded hydrogen atoms. In particular, the products within the scope of the present invention are prepared by the reaction of one or more olefinic hydrocarbons with SiH-containing organopolysiloxanes.

The olefinic hydrocarbons employed in the practice of the present invention can be described as alpha-olefins having the formula:

(3) $\qquad CH_2=C(Y)(Y')$ where Y is a member selected from the class consisting of hydrogen and monovalent hydrocarbon radicals free of aliphatic unsaturation and Y' is hydrogen or an aryl radical.

Among the monovalent hydrocarbon radicals represented by Y are alkyl radicals, such as methyl, ethyl, propyl, isopropyl, decyl, dodecyl and the like, radicals containing up to 24 carbon atoms; aryl radicals, such as phenyl, tolyl, xylyl, naphthyl, etc. radicals; and aralkyl radicals, such as benzyl, phenylethyl, etc. radicals. Preferably, the radical represented by Y is an alkyl radical containing no more than 22 carbon atoms. The aryl radicals represented by Y' include all of the conventional aryl radicals previously mentioned in connection with the definition of Y, with the preferred aryl radical being phenyl. Illustrative of some of the specific alpha-olefins within the scope of Formula 3 are, for example, ethylene, propylene, butene-1, pentene-1, 3-methylbutene-1, hexene-1, 3-methylpentene-1, 4-methylpentene-1, octene-1, decylene-1, dodecylene-1, tetradecylene, hexadecylene-1, octadecylene-1, styrene, alpha-methylstyrene, etc.

Generally speaking, the organopolysiloxane starting materials employed in preparing the products of the present invention are organohydrogen polysiloxanes having the formula:

(4) 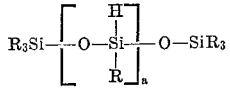

where R and $a$ are as previously defined. In accordance with the preferred embodiment of my invention, in which R is methyl, the starting materials employed in the practice of the present invention can be described as liquid trimethylsilyl chain-stopped methyl hydrogen polysiloxanes containing an average of from 4 to 10 methyl hydrogen siloxane units per molecule. These organohydrogen polysiloxanes are well known in the art.

The reaction between the olefinic hydrocarbon and the organohydrogen polysiloxane of Formula 4 can be effected by relatively straightforward means. Where the product to be prepared is one in which each of the diorgano siloxane units is the same, the reaction, of course, involves a 1-alkene containing at least 12 carbon atoms. Since the reaction of the present invention involves one molecule of the 1-alkene per silicon-bonded hydrogen atom in the organohydrogen polysiloxane of Formula 4, the two reactants are employed in approximately this stoichiometric ratio. Often, the reaction is facilitated by employing an excess, such as a 10 to 20 percent excess, of the olefin for the reaction.

Generally speaking, the reaction is carried out in the presence of a conventional SiH-olefin addition catalyst. These catalysts are generally well known in the art, and useful materials are the elemental platinum catalysts, such as are described in Patent 2,970,150, Bailey or the chloroplatinic acid catalyst described in Patent 2,823,218, Speier et al. Further types of catalysts useful in the addition reactions are the materials which can be described as "platinum alcoholates" of the application of Harry F. Lamoreaux, Ser. No. 207,076, filed July 2, 1962, now U.S. Patent 3,220,972. Still further types of catalysts are the platinum cyclopropane complex which is described and claimed in Patent 3,159,662, Ashby and the platinum ethylene complex described and claimed in Patent 3,159,601, Ashby.

The amount of catalyst employed in effecting reaction between the alpha-olefin of Formula 3 and the organohydrogen polysiloxane of Formula 4 can vary within wide limits, the only requirement being that a sufficient amount of the catalyst is present to effect catalysis with any of the elemental catalysts or the platinum compound catalysts described above. The reaction usually can be effected satisfactorily employing a sufficient amount of catalyst to provide from about 1 mole of platinum per 1,000 moles of olefinically unsaturated groups in the alpha-olefin to one mole of catalyst per million moles of alpha-olefin. When elemental platinum is employed as a catalyst for the addition reaction, more elemental platinum is usually required than one of the platinum compound catalysts. Generally, about ten times as much of the elemental platinum catalyst is employed as one of the platinum compound catalysts. In addition to employing elemental platinum or platinum compounds as catalysts, the reaction employed to prepare the products of the present invention can also be catalyzed by other Group VIII metals, such as palladium, ruthenium, rhodium and the like.

Considering the case in which the composition prepared by the process of the present invention and within the scope of the present invention is to be a homopolymer, i.e., where only a single alpha-olefin is to be reacted with the organohydrogen polysiloxane, the reaction is generally effected by fairly conventional means by first charging the methylhydrogenpolysiloxane, which is a liquid, to a reaction vessel. A portion of the alpha-olefin is then added, generally about 10% of the total amount of alpha-olefin to be employed in the entire reaction. The desired amount of the SiH-olefin addition catalyst is added and the temperature of the reaction mixture is gradually increased until the rate of temperature rise becomes greater than that supplied by the heating element. Subsequently, the reaction temperature is maintained by controlling the rate of addition of the alpha-olefin. Since alpha-olefins which are linear aliphatic compounds containing from 12 to 18 carbon atoms are liquid materials, these alpha-olefins are added dropwise to the reaction mixture until the reaction is completed, as indicated by a drop in the temperature of the reaction mixture. In general, the reaction temperature is from about 50 to 120° C. Where an excess of the alpha-olefin is employed, it is removed from the reaction mixture by distillation.

With alpha-olefins containing 20 carbon atoms or more, the starting olefin is a solid material and, therefore, this starting material must be heated to a temperature above its melting point prior to addition to the reaction vessel and while it is being added dropwise to the reaction mixture. In the case where the organohydrogen polysiloxane is a methylhydrogenpolysiloxane, it is found that the reaction product obtained by adding an aliphatic linear alpha-olefin to the methylhydrogenpolysiloxane is a liquid material when the olefin contains from 12 to 14 carbon atoms and is a solid material having a melting point that increases as the chain length of the product increases beyond 14 carbon atoms. For the hexadecene addition product, the melting point is about 20° C. and increases to almost 45° C. for the addition product of the 22 carbon atom linear alpha-olefin.

When the product of the present invention is a copolymer prepared by adding two or more different alpha-olefins to an organohydrogen polysiloxane, the procedure employed in preparing the reaction product is identical to that described for the addition of a single alpha-olefin, except that care is taken to add as the first alpha-olefin the alpha-olefin which presents the most difficulty in the addition reaction. The reaction also differs in that it is often desirable to add additional catalyst to the reaction mixture at the start of the addition of the second olefin.

The difficulties which can be encountered in the addition of two different alpha-olefins to an SiH-addition reaction are illustrated by problems associated with the addition of alpha-methyl styrene and tetradecene-1 to a methylhydrogenpolysiloxane fluid. Because there is a marked tendency for the self-polymerization of alpha-methyl styrene under the conditions of the present reaction, and remembering that the reaction mixtures employed in preparing the products of the present invention often contain an excess of the alpha-olefin, it is desired to first add the alpha-methyl styrene to the methylhydrogenpolysiloxane and thereafter to add the tetradecene-1 to the reaction mixture to complete the reaction. The amount of alpha-methyl styrene added to the reaction mixture is the stoichiometric amount required to form the desired product and the amount of the tetradecene is the amount required stoichiometrically to complete the reaction plus any desired excess.

With two alpha-olefins being added to methylhydrogenpolysiloxane in the situation in which one of the alpha-olefins is a gaseous material, such as ethylene, propylene, or the like, it is desirable to first add the alpha-olefin containing 12 or more carbon atoms in the desired amount, which obviously must be an amount sufficient to provide a silicon-bonded higher alkyl radical on the desired portion of the silicon atoms, and thereafter the gaseous olefin is added to the reaction mixture.

The following examples are illustrative of the practice of my invention and are not intended for purposes of limitation. All parts are by weight.

In all of the examples, the catalyst employed for the SiH-olefin addition was a platinum alcoholate of the type described in the aforementioned application of Harry F. Lamoreaux. In particular, the catalyst had been prepared by mixing one part by weight of chloroplatinic acid hexahydrate and 10 parts of octyl alcohol and heating the solution at 70 to 75° C. at 25 mm. for 16 hours, during which time all of the water and evolved hydrogen chloride was removed. The pressure was then reduced to 5 mm. to remove all unreacted octyl alcohol. At the end of this time, the product obtained was a dark reddish brown liquid, soluble in alcohols, acetone, benzene, hexane, xylene, toluene and other common solvents, which contained 3.5 atoms of chlorine per atom of platinum and 0.035 part of platinum per part of the mixture. In all of the examples, the course of the reaction was followed by infrared analysis and the reaction was continued for a time sufficient for reaction between all SiH groups in the organohydrogenpolysiloxane with the alpha-olefin.

In evaluating the paintability of a composition prepared in the examples, a steel panel was first cleaned with mineral spirits, then toluene and then dried. The panel was then rinsed with tap water and dried again and then stored in a clean environment. The methylalkylpolysiloxane prepared in the example was dissolved in xylene to form a 5% by weight solution of the silicone. A cotton swab was dipped into the 5% silicone solution and the letter X was marked on the panel with the swab. The solvent was then allowed to evaporate at room temperature. The panel was then sprayed with a pigmented acrylic lacquer of the type used in producing automotive finishes, and the panel was allowed to dry for 24 hours. At the end of this time, the panel was examined and if the X pattern was visible, the panel had failed the test. If the X pattern was not visible, the silicone composition under evaluation had passed the paintability test.

In order to determine the release characteristics of the methylalkylpolysiloxane fluids prepared in the examples, a steel test panel was degreased and thoroughly washed with water and then pickled in concentrated hydrochloric acid for 10 minutes. The panels were then washed, dried and wrapped in aluminum foil until used. The silicone under evaluation was packaged in an aerosol container as a composition containing 0.5 part of the silicone, 39.5 parts chlorothene (which is a tetrachloroethylene) and 60.0 parts of a mixture of Freon 11 and Freon 12 chlorinated hydrocarbons in the ratio of 70 parts of the Freon 11 to 30 parts of the Freon 12. At the time of evaluation of the silicone, the clean steel test panels were sprayed with the silicone from the aerosol container in a light, two-pass application from a distance of 6 inches. The silicone treated panels were placed in the bottom of a standard slab mold with the coated surface facing up. A piece of standard camel-back cold rubber was cut to proper size, the protective cloth removed and the fresh, clean side placed on the treated panel. The mold was then closed and the stock cured for 30 minutes at about 295° F. under a pressure of 2,500 p.s.i. The cured rubber and steel panels were removed from the mold and allowed to cool to room temperature, the rubber was trimmed to the panel size and then the rubber was stripped from the panel at a steady rate of 12 inches per minute. The force required to remove the tape was recorded and this was a measure of the release efficiency applied by the test method. A satisfactory release material requires a force of only about 25 grams. An unsatisfactory release fluid requires a force greater than 25 grams, up to a force of from 200 to 700 grams, which is the force required to remove the cured rubber from an untreated control panel. In the examples, where the force required to release the rubber was less than 25 grams, the release is described as satisfactory. With a force greater than this, the release is reported as unsatisfactory.

EXAMPLE 1

This example illustrates the preparation of a number of methylalkylpolysiloxane fluids from a single alpha-olefin. In this case, the organohydrogenpolysiloxane fluid was a methylhydrogenpolysiloxane within the scope of Formula 4, in which all of the R groups are methyl and in which subscript $a$ has a value of 24. This material was a liquid having a viscosity of 21 centistokes at 25° C. To a reaction vessel was charged 60 grams of the methylhydrogenpolysiloxane fluid and 17 grams of dodecene-1, which was equivalent to 10 percent of the amount theoretically required to react with all of the silicon-bonded hydrogen atoms. To the reaction mixture was then added 0.006 gram of the platinum octoate catalyst and the reaction mixture was heated to a temperature of 56° C. External heat was then withdrawn and 168 grams of dodecene-1 was slowly added at a rate sufficient to maintain the reaction mixture at a temperature of 100° C. The addition required 180 minutes, with the total amount of dodecene-1 added to the reaction mixture being equivalent to 100 percent of the stoichiometric amount required to react with all of the silicon-bonded hydrogen atoms. At the end of this time, the reaction mixture was maintained under a pressure of 3 mm. to evaporate the unreacted dodecene-1, producing a trimethylsilyl chain-stopped methyldodecylpolysiloxane within the scope of Formula 1 which had the properties listed in Table I below. This product was a clear liquid material.

EXAMPLE 2

The procedure of Example 1 was repeated, except that a total of 206 grams of tetradecene-1 was substituted for the dodecene-1 of Example 1, with 20 grams being added prior to heating the reaction mixture and the remainder being slowly added after the reaction mixture had been heated to a temperature of 110° C., which was the temperature at which the reaction was run. This resulted in a methyltetradecylpolysiloxane chain-stopped with trimethylsilyl groups, thus being within the scope of Formula 1, where R is methyl, R' is tetradecyl and $a$ has a value of 24. This material is a liquid at room temperature and its properties are summarized in Table I below.

EXAMPLE 3

The procedure of Example 1 was repeated, except that hexadecene-1 was substituted for dodecene-1 of Example 1, with 22 grams of the hexadecene-1 being added prior to the beginning of the reaction and with 227 additional grams being added during the course of the reaction with the reaction being effected at a temperature of 110° C. The product was a trimethylsilyl chain-stopped methylhexadecylpolysiloxane. The properties of the product are described in Table I below.

EXAMPLE 4

The procedure of Example 1 was repeated, with octadecene-1 substituted for the dodecene-1 of Example 1. The amount of octadecene-1 initially charged to the reaction vessel was 25 grams and the additional amount added during the course of the reaction was 252 grams. This was sufficient to provide a 10 percent excess of octadecene-1 and the reaction was effected at a temperature of 110° C. and the stripping of excess octadecene-1 was effected at a temperature of 180° C. and a pressure of 3 mm. The properties of the resulting trimethylsilyl chain-stopped methyloctadecylpolysiloxane are described in Table I below.

EXAMPLE 5

In this example, the procedure of Example 1 was repeated, except that a linear aliphatic alpha-olefin containing 20 carbon atoms was substituted for the dodecene-1 of Example 1. Since the alpha-olefin was a solid at room temperature, the methylhydrogenpolysiloxane was charged to the reaction vessel, the platinum octoate catalyst was added and these two components were heated to a temperature of 56° C., which is above the melting point of the alpha-olefin. A 28 gram portion of the alpha-olefin was also heated to a temperature above 56° C. and added to the reaction vessel. Thereafter, the temperature of the reaction mixture was increased to 110° C. and additional molten alpha-olefin was added in an amount of 280 grams to the reaction mixture at a rate sufficient to maintain the reaction temperature at 110° C. Excess alpha-olefin was stripped from the reaction mixture at 200° C. and a pressure of 3 mm. to produce a polymer within the scope of Formula 1, where R is methyl and R' is a linear $C_{20}$ aliphatic carbon radical. The properties of this material are described in Table I below.

EXAMPLE 6

The procedure of Example 5 was repeated, except that the alpha-olefin employed was a linear aliphatic alpha-olefin containing 22 carbon atoms with the alpha-olefin being charged in an initial amount of 30 grams and in a total amount of 338 grams during the course of the reaction. This resulted in the expected product within the scope of Formula 1 in which R is methyl, R' is a 22 carbon atom linear aliphatic hydrocarbon radical and in which $a$ is 24. Properties of this material are described in Table I below.

In Table I below are described physical properties of the methylalkylpolysiloxanes of the preceding Examples 1 through 6. In each case, the methyl higher alkylpolysiloxane was evaluated for paintability and release and in each case both of these properties were found to be satisfactory.

TABLE I

| Example | Viscosity (c.s.) | | | Refractive Index $n_D^{20}$ | Pour Point, °C. |
|---|---|---|---|---|---|
| | 0° F. | 100° F. | 210° F. | | |
| 1 | 1,400 | 245 | 51 | 1.4523 | 14 |
| 2 | Solid | 300 | 60 | 1.4545 | |
| 3 | Solid | 245 | 65 | 1.4563 | 39 |
| 4 | Solid | Solid | 75 | 1.4564 | 45 |
| 5 | Solid | Solid | | | |
| 6 | Solid | Solid | | | |

EXAMPLE 7

To a reaction vessel was charged 60 grams of a trimethylsilyl chain-stopped methylhydrogenpolysiloxane fluid within the scope of Formula 4, where R is methyl and $a$ has an average value of 24. To this reaction vessel was added 0.0025 gram of the platinum alcoholate catalyst and 3 grams of alpha-methyl styrene was added to the reaction mixture. The reaction mixture was then heated to 56° C. and an exothermic reaction began which, with the slow addition of 27 more grams of alpha-methyl styrene, kept the reaction temperature in the range of about 60 to 100° C. This addition took place over a 90 minute period and the reaction mixture was then maintained at this temperature for 60 minutes. The amount of alpha-methyl styrene added corresponded to the amount necessary to react with 25 percent of the silicon-bonded hydrogen atoms in the methylhydrogenpolysiloxane. Thereafter, an additional 0.0025 gram of the platinum alcoholate catalyst was heated to a temperature of 110° C. and 144 grams of additional tetradecene-1 was added to the reaction mixture over a one hour period. At the end of this time, the reaction mixture was maintained at a pressure of 3 mm. at a temperature of 180° C. to remove unreacted tetradecene. This resulted in a methylalkylpolysiloxane within the scope of Formula 1 in which R is methyl and in which $a$ has a value of 24 and in which 25 percent of the R' groups are beta-phenylpropyl groups and 75 percent of the R' groups are tetradecyl groups. This resulting material was a clear liquid having a viscosity of 1,000 centistokes at 100° C. and a pour point of 0° C. This material passed both the paintability and release tests described above.

EXAMPLE 8

To a reaction vessel is charged 120 grams of the methylhydrogenpolysiloxane employed in Example 7, 0.00125 gram of the platinum alcoholate catalyst and 108 grams of alpha-methyl styrene. This reaction mixture is heated to a temperature of 56° C. at which point an exothermic reaction occurs, and over a period of 90 minutes an additional 104 grams of alpha-methyl styrene were added to the reaction mixture at a rate sufficient to maintain the reaction temperature in the range of from 110 to 120° C. The total amount of alpha-methyl styrene added to the reaction mixture was sufficient to react with 50% of the silicon-bonded hydrogen atoms in the methylhydrogenpolysiloxane. At the end of this time, an additional 0.00125 gram of the platinum alcoholate catalyst was added. The reaction mixture was then heated to a temperature of 110° C. and maintained at this temperature while an additional 180 grams of the dodecene-1 were added and the reaction mixture was subsequently maintained at a temperature of 180° C. at a pressure of 3 mm. to evaporate the excess dodecene. This resulted in a polysiloxane within the scope of Formula 1 in which R is methyl, $a$ is 30 and in which 50% of the silicon atoms contained a beta-phenylpropyl substituent and 50% of the silicon atoms contained a dodecyl substituent. The final product was a clear, colorless liquid having a viscosity of 1,300 centistokes at 100° C., a pour point of 0° C. This fluid passed both the release test and the paintability test.

EXAMPLE 9

To a reaction vessel was charged 120 grams of a methylhydrogenpolysiloxane fluid within the scope of Formula 4, where R is methyl and $a$ has an average value of 4. To the reaction vessel was also charged 0.00125 gram of the platinum alcoholate catalyst and 18 grams of dodecene-1. The reaction mixture was then heated to a temperature of 56° C. and while maintaining the reaction mixture at this temperature, 162 additional grams of the dodecene was added to the reaction vessel, and the reaction vessel was maintained at a temperature of 110° C. for an additional 2 hours, to insure complete reaction of the dodecene with the methylhydrogenpolysiloxane fluid. The amount of dodecene employed was sufficient to react with 50% of the available silicon-bonded hydrogen atoms. At the end of the reaction with the dodecene, 0.00125 additional gram of the platinum alcoholate catalyst was added and the reaction mixture was heated to a temperature of 70° C. at which time ethylene was bubbled into the reaction mixture and the rate of ethylene addition was controlled so as to maintain the temperature of the reaction at 85° C. Bubbling of the ethylene into the reaction mixture was continued for 4 hours, during which time the ethylene reacted with all of the remaining silicon-bonded hydrogen atoms. Thereafter, the reaction mixture was allowed to cool to room temperature, resulting in a clear, colorless liquid material within the scope of Formula 1, where R is methyl, $a$ is 4 and in which 50% of the R' groups are dodecyl radicals and 50% of the R' groups are ethyl radicals. This material exhibited both satisfactory release and paintability.

EXAMPLE 10

In this example, the procedure of Example 9 was repeated through the reaction of the dodecene with the methylhydrogenpolysiloxane. However, in this example, the remainder of the silicon-bonded hydrogen groups were reacted with 4-methylpentene-1 instead of with ethylene. This was accomplished by adding to the reaction mixture, after the dodecene addition, 0.00125 additional gram of the platinum alcoholate catalyst. Thereafter the reaction mixture was heated to a temperature of 86° C. and maintained at this temperature while 70 grams of the methylpenetne was slowly added over a period of 2 hours. The reaction mixture was then stripped of excess 4-methylpentene-1 at a temperature of 140° C. and a pressure of 3 mm. This resulted in a polysiloxane within the scope of Formula 1, in which R is methyl, $a$ has an average value of 24 in which 50% of the R' groups are dodecyl and 50% of the R' groups are 4-methylpentyl. This material satisfactorily passed both the paintability test and the release test.

EXAMPLE 11

To a reaction vessel is charged 120 grams of an organohydrogenpolysiloxane fluid which is a trimethylsilyl chain-stopped copolymer of methylhydrogensiloxane units and diphenylsiloxane units with an average molecule containing 22.2 methylhydrogensiloxane units and 1.8 diphenylsiloxane units. To this reaction vessel is also added 0.00125 gram of the platinum octoate catalyst and 20 grams of tetradecene-1. The reaction mixture is then heated to a temperature of 56° C. and 150 additional grams of tetradecene-1 are added over a period of 3 hours, during which time the reaction mixture is maintained at a temperature of 110° C. At the end of this time, excess tetradecene-1 is stripped from the reaction mixture by maintaining the mixture at a pressure of 3 mm. and a temperature of 180° C. This results in a clear, liquid organopolysiloxane within the scope of Formula 1, where the terminal R groups are methyl, 10% of the remaining R groups are phenyl and the remainder of the R groups are methyl. In the polysiloxane, approximately 10% of the R' groups are phenyl and the remainder of the R' groups are tetradecyl. This material satisfactorily passes both the release and paintability tests.

EXAMPLE 12

To a reaction vessel was charged 120 grams of a trimethylsilyl chain-stopped copolymer of methylhydrogenpolysiloxane units and phenylhydrogenpolysiloxane units with there being an average of 40 silicon atoms per molecule with 10 percent of the silicon atoms containing a phenyl substituent. To this reaction vessel was also charged 0.00125 gram of the platinum alcoholate catalyst and 20 grams of dodecene-1. The reaction mixture was heated to a temperature of 56° C. and maintained at this temperature for a period of 3 hours, during which time 181 additional grams of dodecene-1 were added to the reaction mixture. The total amount of dodecene-1 added to the reaction mixture was sufficient to react with 60% of the silicon-bonded hydrogen atoms in the methylphenylhydrogenpolysiloxane. At the end of this time, butene-1 was bubbled into the reaction mixture which was maintained at a temperature of 100° C. and the reaction mixture was maintained in a butene-1 atmosphere until all of the available silicon-hydrogen linkages had reacted with the butene-1. Thereafter, the reaction mixture was exposed to the atmosphere at a temperature of 100° C. to evaporate any dissolved butene-1 and the reaction mixture was thereafter allowed to cool to a clear, colorless liquid. This material correspond to the polysiloxane of Formula 1, where the terminal R groups are methyl, where 10 percent of the other R groups are phenyl and where the remaining R groups are methyl. In the polysiloxane, 60% of the R' groups are dodecyl and 40% of the R' groups are butyl. This material exhibits satisfactory release and paintability.

EXAMPLE 13

In order to compare the polysiloxanes of the present invention with polysiloxanes differing only slightly therefrom, the procedure of Example 1 was repeated except that decene-1 was substituted for the dodecene of Example 1. This resulted in a trimethylsilyl chain-stopped methyldodecyclpolysiloxane within the scope of Formula 1 in which the R groups are methyl, the R' groups are decyl and $a$ has a value of 24. The material of this example was subjected to both the release test and the paintability tests. While the material of this example was satisfactory on release, it failed the paintability test by virture of the fact that the letter "X" painted on the test panel was clearly visible at the end of the test. In order to compare further compositions within the scope of the present invention with closely related compositions, the methyldodecylpolysiloxane fluid of Example 1, the methyloctadecylpolysiloxane fluid of Example 4, and the copolymer fluid of Example 8 were compared with the methyldecyl fluid of the present example with respect to their effectiveness as a satisfactory release agent in the die casting of aluminum parts. Four aerosal solutions were made up, each of which contained the proportions of ingredients employed in the release test described above. The inner portions of a mold were coated with each of these organopolysiloxanes, the solvents were allowed to evaporate, and molten aluminum was poured into the molds. After the aluminum had solidified, the cast aluminum articles were removed from the mold. In each case, the organopolysiloxane provided excellent release. A commercial oil-modified, alkyd resin paint was then sprayed upon each of the cast aluminum articles, and allowed to dry for 24 hours. Examination of the four cast articles showed that the articles cast in the molds coated with the silicones of Examples 1, 4 and 8, had a tightly adherent paint coating. On the other hand, the paint peeled easily from the article cast in the mold coated with the methyldecyl silicone fluid of Example 13.

While the foregoing examples have illustrated a number of the embodiments of my invention, it should be understood that many additional variations are possible within the scope of my invention. While the various organopolysiloxanes of the present invention are quite satisfactory for release agents and paintable release agents under substantially all environments, it is sometimes found that those compositions within the scope of the present invention which contain silicon-bonded aralkyl radicals are sometimes not as stable as desired for all applications. This is particularly true of compositions containing beta-phenylpropyl substituents. In such cases, conventional oxidation inhibitors have been found to increase the utility of such materials. While any conventional oxidation inhibitor can be employed, satisfactory results have been obtained using 4,4-methylene bis-2,6-ditertiarybutylphenol as an oxidation inhibitor.

While the examples have illustrated the addition of a single alpha-olefin and two different alpha-olefins serially to an organohydrogenpolysiloxane fluid to prepare products within the scope of the present invention, it should be understood that the products within the present invention can result from the adidtion of mixtures of alpha-olefins to organohydrogenpolysiloxanes and can also result from the serial adidtion of more than two alpha-olefins to the organohydrogenpolysiloxanes.

In addition to being useful as a paintable release agent for environments in which the painting agent is to be an oil modified alkyl resin or an acrylic resin paint, it should be understood that the products of the present invention are useful with all presently known types of pain environments. Additionally, these materials are useful as paintable release agents in the casting of metal other than aluminum, such as, for example, zinc.

What I claim as new and desire to secure by Letters Patent of the United States is:

1. An organopolysiloxane useful as a paintable release agent and having the formula:

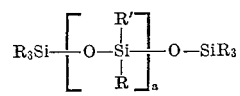

where R is a member selected from the class consisting of methyl and phenyl and R' represents a monovalent hydrocarbon radical selected from the class consisting of alkyl radicals having at least two and up to 22 carbon atoms, mononuclear and binuclear aryl radicals, phenyl lower alkyl radicals and cycloalkyl radicals, at least 50% of the R' radicals being alkyl radicals containing at least 12 and up to 22 carbon atoms, and $a$ has an average value of from 4 to 40.

2. An organopolysiloxane useful as a paintable release agent and having the formula:

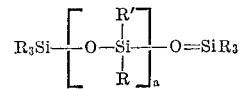

where R is methyl, R' is an alkyl radical containing at least 12 and up to 22 carbon atoms, and $a$ has a value of from 4 to 40.

3. An organopolysiloxane useful as a paintable release agent and having the formula:

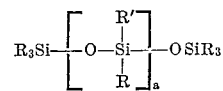

where R is methyl, R' is dodecyl and $a$ has a value of from 4 to 40.

4. An organopolysiloxane useful as a paintable release agent and having the formula:

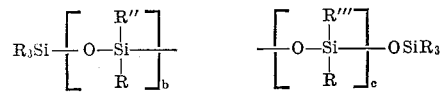

where R is a member selected from the class consisting of methyl and phenyl, R'' is an alkyl radical having at least 12 and up to 22 carbon atoms, R''' is different from R'' and represents a monovalent hydrocarbon radical selected from the class consisting of alkyl radicals having at least two and up to 22 carbon atoms, mononuclear and binuclear aryl radicals, phenyl lower alkyl radicals and cycloalkyl radicals, the sum of $b$ plus $c$ is from 4 to 40, inclusive, $c$ is equal to from 2 to 20, inclusive, and $b$ is at least equal to $c$.

5. The composition of claim 4, in which R is methyl.

6. The composition of claim 4, in which R is methyl and R'' is dodecyl.

7. The composition of claim 4, in which R is methyl, R'' is dodecyl and R''' is beta-phenylpropyl.

8. An organopolysiloxane of claim 1 in which the alkyl radical represented by R' contains from 12 to 18 carbon atoms.

9. An organopolysiloxane of claim 2 in which said alkyl radical contains from 12 to 18 carbon atoms.

10. The composition of claim 4 in which R is methyl, R'' is tetradecyl, and R''' is beta-phenylpropyl.

References Cited

UNITED STATES PATENTS

| | | | |
|---|---|---|---|
| 2,486,162 | 10/1949 | Hyde | 260—448.2 XR |
| 2,521,673 | 9/1950 | Britton et al. | 260—448.2 XR |
| 3,186,964 | 6/1965 | Kookootsedes et al. | 260—448.2 XR |

TOBIAS E. LEVOW, *Primary Examiner.*

P. F. SHAVER, *Assistant Examiner.*

U.S. Cl. X.R.

260—46.5; 106—38.22